United States Patent [19]

Crider et al.

[11] 4,412,166
[45] Oct. 25, 1983

[54] STEPPER MOTOR DRIVE CIRCUIT FOR SYNCHRONOUS SWITCHING OF CORE WINDING

[75] Inventors: Chester H. Crider; Charles R. Linton, both of Austin, Tex.

[73] Assignee: International Business Machines Corporation, Armonk, N.Y.

[21] Appl. No.: 238,399

[22] Filed: Feb. 26, 1981

[51] Int. Cl.³ ............................................. G05B 19/40
[52] U.S. Cl. .................................... 318/696; 318/685
[58] Field of Search ................. 318/696, 685; 360/77, 360/78; 307/362, 360, 247 R, 289, 291

[56] References Cited

U.S. PATENT DOCUMENTS 4,072,888 2/1978 Bechtle et al. .
4,127,801 11/1978 Leenhouts .

OTHER PUBLICATIONS

*IBM Technical Disclosure Bulletin,* Jan. 1980, vol. 22, No. 8A, p. 3048, "Timing Control for DC Motor Driver with Dynamic Braking", J. A. Bailey, R. G. Black, Jr., and V. Espinoza.

*Primary Examiner*—J. V. Truhe
*Assistant Examiner*—Saul M. Bergmann
*Attorney, Agent, or Firm*—J. B. Kraft

[57] ABSTRACT

A stepper motor drive circuit is provided for preventing undesirable cross conduction on complementary winding drivers during switching. The circuit provides a current path from a source through at least one winding about a core in the motor; the path has two branches. There is a first switching device in the first of said branches switchable to conduction or non-conduction through the branch and a second switching device in the second of said branches switchable to conduction or non-conduction through the second branch. Sensing means, operative during the switching of said switching devices, sense the non-conductive state through the branch being turned off. Means responsive to the sensing by said sensing means of the non-conductive state, then switch the switching device in the branch being turned on to conduct current through said branch.

11 Claims, 2 Drawing Figures

STEPPER MOTOR DRIVE CIRCUIT FOR SYNCHRONOUS SWITCHING OF CORE WINDING

BACKGROUND OF THE INVENTION

1. Field of the Invention

The present invention relates to stepper motor drive circuits and particularly to circuits for controlling the flow of current through the windings on the stepper motor cores during the switching of the winding to step the motor.

2. Description of the Prior Art

In the standard operation of stepper motors, each increment of movement from one detent position of the motor to the next involves the switching of flux through the cores in the stepper motor. This is accomplished by switching the current in the winding mounted about said core. Two accepted methods of switching current in the windings involve bipolar and unipolar circuits. In the bipolar circuit, there is a single winding about each core and change in flux through the core is accomplished by switching the current flow in said winding from one direction to the other. A conventional circuit for achieving a switch in current direction in bipolar switching circuits involves the H-driver circuit which will be described in detail hereinafter.

Another conventional method of switching flux in the cores involves unipolar circuits wherein each core is bifilar wound, i.e., the windings about the cores each have a first coil in which current flows to create flux in one direction and a second coil in which current flows to create flux in the opposite direction. Thus, in order to change the flux through the core, one coil is turned on while the other is turned off and vice versa. These bifilar wound switching circuits are well known in the art. U.S. Pat. Nos. 4,072,888 and 4,127,801 are representative examples of the use of bifilar wound switching circuit in the stepper motor art.

In developing, and working with such stepper motor core switching circuits, we have encountered a problem. The switching circuits generally use transistors which are switched on and off in order to switch the current flow in the windings and consequently the flux in the core. The transistors are arranged in some sort of a complementary arrangement wherein one or more transistors controlling a first current path providing a flux in a first direction switched on while the other complementary transistor or transistors providing a current path in the opposite direction are switched off or vice versa. Because of transient charge storage on the transistors involved, there is considerably slower turn off time in each of the transistors than there is a turn on time in their complementary devices. As a result, if one of the switching transistors is turned on simultaneously with the other being turned off, a situation will be encountered every time the transistors are switched wherein, one or both of the switching transistors will be subject to a brief high current surge during the switching period. This results from both transistors being simultaneously on. In ordinary stepper motors, where switching occurs hundreds of times per second, these repetitive surges will damage the switching transistors and significantly reduce their lives.

As will be described hereinafter in greater detail, the present invention solves this problem with sensing means operative during each of the repetitive switching steps in the stepping of the motor which sense the conduction of the current in the path of the switch being turned off. Then, means responsive to such sensing means switch the switching transistor in the path being turned on to then conduct currents through the path.

In this connection attention is directed to the article "Timing Control for DC Motor Driver with Dynamic Braking", authored by J. A. Bailey, R. G. Black, Jr., and V. Espinoza, *IBM Technical Disclosure Bulletin*, January 1980, Vol. 22, No. 8A, page 3048. This article deals with a circuit for dynamic braking of a D.C. motor wherein the transistor switch for that motor is turned off but the voltage level across that turned-off switch is sensed, and another transistor which shunts the motor during braking to permit the motor discharge is not turned on until the motor driver transistor is fully off. Clearly this article does not relate to the repetitive switching of current through the coils of a stepper motor or any motor, i.e., it deals with the one shot stopping of a D.C. motor when a stop input is made at the designated terminal.

SUMMARY OF THE PRESENT INVENTION

The present invention substantially eliminates the above described power surge problem during relatively high speed repetitive switching by providing a stepper motor drive circuit for controlling the current flow from a power source through the stepper motor which comprises a current path from the source through the motor including at least one winding about a core in a stepper motor; this path has two branches. A first switching device in the first branch is switchable to conduction or non-conduction through the branch, and a second switching device in the second branch is switchable to conduction or to non-conduction through said second branch. The invention further includes sensing means which are operative during the switching of the above switching devices to sense the non-conduction of current through the branch being turned off. Then, means responsive to the sensing of non-conduction in the branch being turned off by the sensing means, switches the switching device in the branch being turned on to then conduct current through said branch.

The present invention is applicable to both unipolar stepper motor drive circuits wherein the cores in the motor each include two windings and each of the two branches of the current path passes respectively through one of the windings, and to bipolar stepper motor drive circuits wherein there are only single windings around the cores in the stepper motor. One end of such a winding is connected to the first switching device and the other end of the winding is connected to the second switching device.

BRIEF DESCRIPTION OF THE DRAWINGS

Referring now to the drawings, wherein a preferred embodiment of the invention is illustrated, and wherein like reference numerals are used throughout to designate like parts.

DETAILED DESCRIPTION OF THE PREFERRED EMBODIMENT

Figure 1:
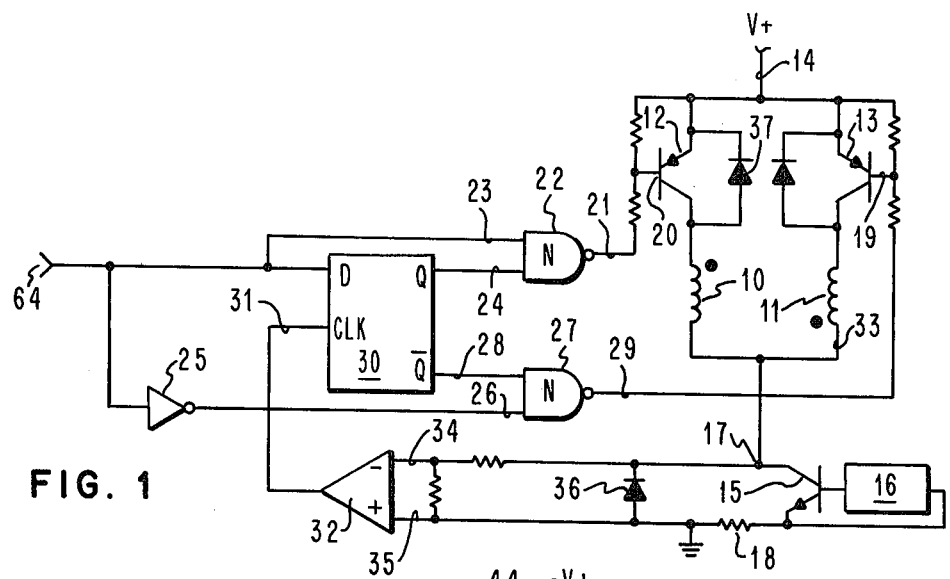
FIG. 1 is a diagrammatic representation of the present invention as applied to unipolar stepper motor switching circuits.

Referring to FIG. 1, there will now be described a simple switching operation involving a unipolar switching cricuit comprising bifilar windings 10 and 11 wound about a core, not shown. Switching transistors 12 and 13, respectively determine whether current will flow through either winding 10 or winding 11, respectively from voltage source 14 through the respective transistor 12 or 13 and winding 10 or 11 and then through transistor 15 to ground. It should be noted that transistor 15 together with chopper circuit 16 performs a conventional stepper motor chopping operation which is well known in the art and described in detail in the above-mentioned U.S. Pat. Nos. 4,072,888 and 4,127,801.

Chopper circuit 16 may be any conventional chopper circuit such as that described in the *Sigma Stepping Motor Handbook* at pages 35 and 36. The stepper motor drive circuitry involving transistor 15 and chopper circuit 16 does not form a part of the present invention. In fact, the present invention may be just as readily practiced if the transistor 15 and chopper circuit 16 were eliminated and node 17 shunted directly to resistor 18 and then to ground. In the chopper circuit shown, for purposes of modulating the current level in the stepper motor windings, chopper circuit 16 turns transistor 15 on and off at a much greater rate than windings 10 and 11 are switched. Accordingly, during every switching cycle, transistor 15 will go on and off several times. In any event for the purposes of the present invention, even if transistor 15 and chopper circuit 16 are present, the operation to be hereinafter described will be assumed to take place during the portion of the chopping operation when transistor 15 is on.

Now in describing a switching operation with respect to FIG. 1, let us assume that PNP transistor 13 is on, i.e., its base 19 is low (in the driven state) and transistor 12 is off, i.e., its base 20 is high (non-driven state). Accordingly, output 21 from NAND gate 22 is up, inputs 23 and 24 to NAND gate 22 are down. Consequently, the input 64 to the drive circuit is down. The output from inverter 25 to terminal 26 of NAND gate 27 is up. The other terminal 28 to the NAND gate 27 is also up. Consequently, the output 29 from the NAND gate 27 to base 19 is down thereby maintaining the base of transistor 13 in the driven state. Let us now consider what occurs when the transistors are switched: input 64 is brought up. This is inverted through inverter 25 which brings input 26 to NAND gate 27 down; this in turn brings output 29 from NAND gate 27 up thereby removing the drive from base 19 of transistor 13 to turn transistor 13 off. However, the outputs from bistable latch 30 still remain the same, i.e., output Q on line 24 is down while its complementary output $\overline{Q}$ on line 28 remains up. It should be noted that although input 64 is loaded into latch 30 at point D, latch 30 will not change its output Q and $\overline{Q}$ to reflect this input change until it receives a clock input pulse on line 31 from comparator circuit 32. Accordingly, while input 24 brought terminal 23 to NAND gate 22 up, its other terminal 24 will remain down until a clock or reset pulse appears on line 31. Consequently, base 20 will be in the non-driven condition and transistor 12 will remain non-conductive as well as transistor 13 will be non-conductive. As the current level passing through branch 33 which includes switched-off transistor 13 drops, the voltage level at node 17 being sensed by input 34 of comparator 32 will drop. Actually, a reverse or fly back current develops in a path including diode 36, node 17, coil 10 and diode 37. It is this fly back current which drops node 17 below ground level, i.e., voltage level goes somewhat negative. Consequently, this negative output is sensed by input 34 of comparator 32. The other input 35 to comparator 32 is referenced to ground. When input 34 drops to below ground, comparator 32 will provide a clock signal on line 31 which in turn will bring output Q to input line 24 up and its complement $\overline{Q}$ on output line 28 down. This will produce a down signal on line 21 to drive base 20 of transistor 12 thereby rendering this transistor conductive. On the other hand, the output 29 from NAND gate 27 to base 19 of transistor 13 will remain up and transistor 13 will remain non-conductive. Thus, the switch from the current path involving winding 11 to the current path involving winding 10 is completed. In the circuit described hereinabove, the sensing for non-conduction of current through the branch being turned off, i.e., branch, 33 was sensed indirectly at node 17 by sensing the affect of the fly back current path involving diodes 36 and 37 and coil 10. It should be noted that alternative means for sensing may involve direct sensing at a node within the branch being turned off.

Figure 2:
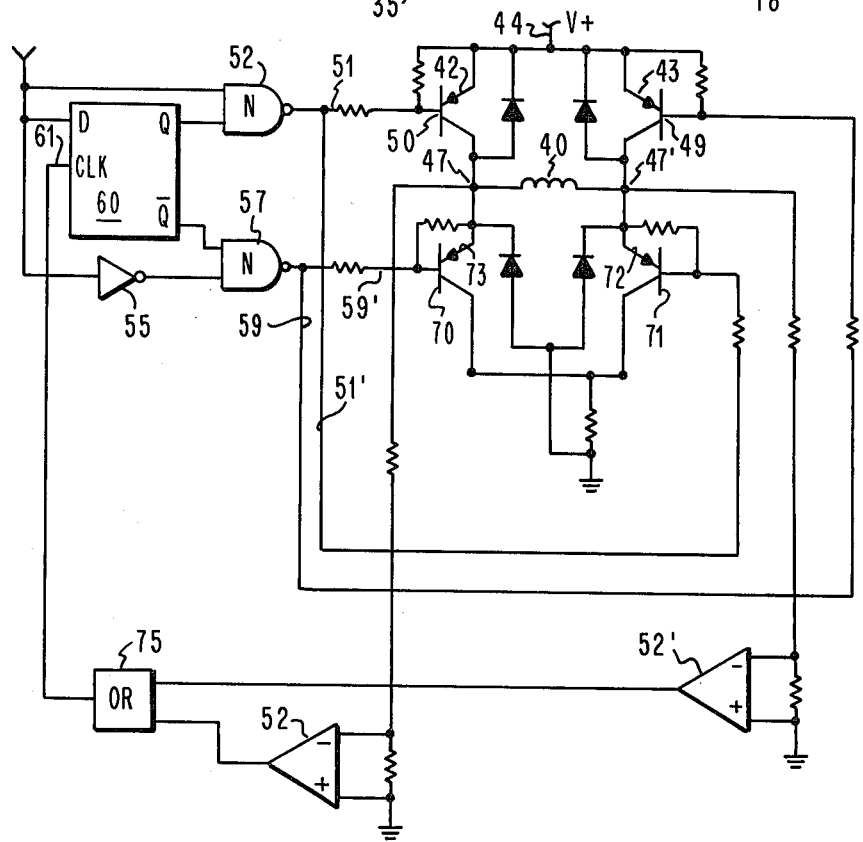
FIG. 2 is a diagrammatic representation of the present invention as applied to a bipolar stepper motor switching circuit.

In a similar fashion, the present invention is applicable to the switching of stepper motor bipolar switching circuits such as the H driver circuit shown in FIG. 2. In the H driver circuit, transistor pairs 43 and 73, and 42 and 72 are respectively the equivalents of single transistors 12 and 13 in FIG. 1 and are turned on and off by the circuitry shown in a manner substantially equivalent to the switching of transistors 12 and 13. The H circuit is different in that a single winding 40 on stepper motor core replaces the bifilar windings 10 and 11 of FIG. 1. Accordingly, a current path is provided from voltage source 44 which may proceed through transistor 43 and winding 40 in one direction and transistor 73 and then to ground or switch to the path from voltage source 44 including transistor 42, winding 40 in the opposite direction and then through transistor 72 to ground. The switching in FIG. 2 is accomplished in a manner functionally equivalent to that of the circuit in FIG. 1, i.e., bistable latch 60 serves the same function as bistable latch 30. NAND gates 52 and 57, respectively serve the same function as NAND gates 22 and 27 in FIG. 1, inverter 55 serves the same function as inverter 25 in FIG. 1. Output line 51 from NAND gate 52 to base 50 of transistor 42 also has a spur 51' to base 71 of transistor 72 so that transistors 42 and 72 can be turned on and off simultaneously. Similarly, output line 59 from NAND gate 57 to base 49 of transistor 43 also has a spur 59' to base 70 of transistor 73 so that transistors 43 and 73 are turned on and off simultaneously by the output from NAND gate 57. The switching cycle in circuit of FIG. 2 operates in a similar fashion to that described with respect to the circuit of FIG. 1 except that during the switching cycle when one set of transistors 43 and 73 or 42 and 72 is turned off, prior to turning the other set on, the change in current results in a drop in voltage level sensed at two nodes 47 and 47' through a pair of comparators 52 and 52'. The outputs of comparators 52 and 52' are ORed through OR gate 75 consequently a signal on either comparator will result in a clock or reset signal on line 61 to latch 60.

While the invention has been particularly shown and described with reference to a preferred embodiment it will be understood by those skilled in the art that various other changes in form and detail may be made without departing from the spirit and scope of the invention.

What is claimed is:

1. A stepper motor drive circuit for controlling current flow from a power source through a stepper motor comprising:
    a current path from said source through said motor including at least one winding about a core, said path having two branches,
    a first switching device in the first of said branches switchable to conduction or non-conduction through said branch,
    a second switching device in the second of said branches switchable to conduction or to non-conduction through said branch,
    sensing means operative during the switching of said switching devices to sense the non-conduction of current through the branch being turned off,
    and means responsive to said sensing means to switch the switching device in the branch being turned on to then conduct current through said branch.

2. The stepper motor drive circuit of claim 1 wherein said current path comprises said core with only a single winding, one end of said winding being connected to said first switching device and the other end of said winding being connected to the second switching device.

3. The stepper motor drive circuit of claim 1 wherein said sensing means is connected to said current path at a point whereat said last one winding is between said sensing means and said switching devices.

4. A stepper motor drive circuit for controlling current flow from a power source through a stepper motor comprising:
    a current path from said source through said motor having two branches, the first of said branches including a first winding about a core and the second branch including a second winding about said core,
    a first switching device in the first of said branches switchable to conduction or non-conduction through said branch,
    a second switching device in the second of said branches switchable to conduction or to non-conduction through said branch,
    sensing means operative during the switching of said switching devices to sense the non-conduction of current through the branch being turned off,
    and means responsive to said sensing means to switch the switching device in the branch being turned on to then conduct current through said branch.

5. The stepper motor drive circuits of claim 2 wherein each of said switching devices comprises a transistor.

6. The stepper motor drive circuit of claim 5 wherein said means responsive to said sensing means comprises latching means for switching and latching the switching device in the branch being turned on to the current conductive state, and
    said latching means further comprises means responsive to an input off signal for latching the switching means in the branch being turned off to the non-conductive condition.

7. The stepper motor drive circuit of claim 3 wherein said first switching device comprises the first transistor connected to one end of said winding and a second transistor connected to the other end of said winding, and
    said second switching device comprises third transistor connected to one end of said coil and a fourth transistor connected to the other end of said coil.

8. A two phase stepper motor drive circuit for controlling current flow from a unidirectional power source to a stepper motor having at least one bifilar winding formed into two coils comprising
    a first switching device connected in series with a first of said coils and the source of power and being switchable to conduct current through said first coil or to non-conduct current through said first coil,
    a second switching device connected in series with the second of said coils and said source of power and being switchable to conduct current through said second coil or to cut off current through said second coil,
    means, operative during the switching of said switching devices, to sense the cutting off of current through one of the coils, and
    means responsive to said sensing means to switch the switching device in series with the other coil to conduct current through said other coil.

9. The stepper motor drive circuit of claim 8 wherein said sensing means is connected to said current path at a point whereat said coils are between said sensing means and said switching devices.

10. The stepper motor drive circuits of claim 8 wherein each of said switching devices comprises a transistor.

11. The stepper motor drive circuit of claim 10 wherein said means responsive to said sensing means comprises latching means for switching and latching the switching device being turned on to the current conductive state, and
    said latching means further comprising means responsive to an input off signal for latching the switching means being turned off to the non-conductive condition.

* * * * *